US012738760B2

(12) United States Patent
Makita et al.

(10) Patent No.: US 12,738,760 B2
(45) Date of Patent: Sep. 15, 2026

(54) ELECTRONIC DEVICE, CHARGING SYSTEM, AND CHARGING METHOD

(71) Applicant: Sony Group Corporation, Tokyo (JP)

(72) Inventors: Tetsuya Makita, Tokyo (JP); Go Tanaka, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 573 days.

(21) Appl. No.: 18/550,463

(22) PCT Filed: Mar. 26, 2021

(86) PCT No.: PCT/JP2021/012868
§ 371 (c)(1),
(2) Date: Sep. 14, 2023

(87) PCT Pub. No.: WO2022/201489
PCT Pub. Date: Sep. 29, 2022

(65) Prior Publication Data
US 2024/0154448 A1 May 9, 2024

(51) Int. Cl.
*H02J 7/90* (2026.01)
*H02J 7/40* (2026.01)
*H02J 7/50* (2026.01)
*H02J 7/82* (2026.01)

(52) U.S. Cl.
CPC ................ *H02J 7/971* (2026.01); *H02J 7/40* (2026.01); *H02J 7/50* (2026.01); *H02J 7/82* (2026.01); *H02J 7/933* (2026.01)

(58) Field of Classification Search
CPC ...... H02J 7/971; H02J 7/40; H02J 7/50; H02J 7/82
See application file for complete search history.

(56) References Cited

U.S. PATENT DOCUMENTS 11,165,270 B2 * 11/2021 Owen ................. H01M 10/425
2016/0064960 A1 * 3/2016 DiCarlo .................... H02J 7/00 320/134
2020/0303938 A1 9/2020 Owen

FOREIGN PATENT DOCUMENTS

JP 2018-186631 A 11/2018
JP 2020-048317 A 3/2020
JP 2020-124061 A 8/2020
JP 2020-191719 A 11/2020
JP 2020191719 * 11/2020

OTHER PUBLICATIONS

International Search Report and Written Opinion mailed on Jun. 1, 2021, received for PCT Application PCT/JP2021/012868, filed on Mar. 26, 2021, 8 pages including English Translation.

* cited by examiner

*Primary Examiner* — Richard V Muralidar
(74) *Attorney, Agent, or Firm* — XSENSUS LLP

(57) ABSTRACT

An electronic device includes: a battery; an acquisition unit that acquires, at each predetermined timing, satisfaction level information in which a residual capacity of the battery and a user satisfaction level with the residual capacity are associated with each other; and a charging unit that charges the battery with a charging voltage calculated as a voltage for charging the battery until the battery has a residual capacity that makes it difficult for a subsequent user satisfaction level to fall below a specific satisfaction level based on of a plurality of the pieces of satisfaction level information acquired and accumulated by the acquisition unit.

11 Claims, 13 Drawing Sheets

13a

| USER SATISFACTION LEVEL | RESIDUAL CAPACITY RATE (%) |
|---|---|
| SATISFACTION LEVEL L1 | X1 … … |
| SATISFACTION LEVEL L2 | X2 … … |
| SATISFACTION LEVEL L3 | X3 … … |
| SATISFACTION LEVEL L4 | X4 … … |
| SATISFACTION LEVEL L5 | X5 … … |

ELECTRONIC DEVICE, CHARGING SYSTEM, AND CHARGING METHOD

CROSS-REFERENCE TO RELATED APPLICATION

The present application is based on PCT filing PCT/JP2021/012868, filed Mar. 26, 2021, the entire contents of which are incorporated herein by reference.

FIELD

The present disclosure relates to an electronic device, a charging system, and a charging method.

BACKGROUND

It is known that a battery used in an electronic device such as a mobile terminal device deteriorates with repeated use (For example, see Patent Literature 1.).

CITATION LIST

Patent Literature

Patent Literature 1: JP 2020-48317 A

SUMMARY

Technical Problem

When a charging voltage is increased, a residual capacity (battery capacity) of a battery after charging increases, but battery deterioration is likely to proceed. When the charging voltage is lowered, battery deterioration is suppressed, but the battery capacity is reduced. As described above, there is a trade-off relationship between the suppression of the battery deterioration and the securing of the battery capacity, but a balance point for achieving both is different for each user.

One aspect of the present disclosure provides an electronic device, a charging system, and a charging method capable of achieving both suppression of battery deterioration and securing of battery capacity for each user.

Solution to Problem

An electronic device according to one aspect of the present disclosure includes: a battery; an acquisition unit that acquires, at each predetermined timing, satisfaction level information in which a residual capacity of the battery and a user satisfaction level with the residual capacity are associated with each other; and a charging unit that charges the battery with a charging voltage calculated as a voltage for charging the battery until the battery has a residual capacity that makes it difficult for a subsequent user satisfaction level to fall below a specific satisfaction level based on of a plurality of the pieces of satisfaction level information acquired and accumulated by the acquisition unit.

A charging system according to one aspect of the present disclosure includes: a plurality of electronic devices; and a proposal device configured to be able to communicate with each of the plurality of electronic devices, wherein each of the plurality of electronic devices includes: a battery; an acquisition unit that acquires, at each predetermined timing, satisfaction level information in which a residual capacity of the battery and a user satisfaction level with the residual capacity are associated with each other; and a charging unit that charges the battery, the plurality of electronic devices include a first electronic device in which the charging unit charges the battery with a charging voltage calculated as a voltage for charging the battery until the battery has a residual capacity that makes it difficult for a subsequent user satisfaction level to fall below a specific satisfaction level based on of a plurality of the pieces of satisfaction level information acquired and accumulated by the acquisition unit, and the proposal device proposes charging with a charging voltage calculated as a voltage for charging the battery of the first electronic device to a user of a second electronic device different from the first electronic device.

A charging method according to one aspect of the present disclosure includes: acquiring, at each predetermined timing, satisfaction level information in which a residual capacity of a battery of an electronic device and a user satisfaction level with the residual capacity are associated with each other; and charging the battery with a charging voltage calculated as a voltage for charging the battery until the battery has a residual capacity that makes it difficult for a subsequent user satisfaction level to fall below a specific satisfaction level based on of a plurality of the acquired and accumulated pieces of satisfaction level information.

DESCRIPTION OF EMBODIMENTS

Hereinafter, embodiments of the present disclosure will be described in detail with reference to the drawings. Note that, in the following embodiments, the same elements are denoted by the same reference signs, and redundant description will be omitted.

The present disclosure will be described according to the following order of items shown below.

1. Embodiment
   1.1. Embodiment of electronic device
   1.2. Embodiment of charging system
2. Example of hardware configuration
3. Modification examples
4. Effects

1. EMBODIMENT

1.1. Embodiment of Electronic Device

Figure 1:
FIG. 1 is a diagram illustrating an example of a schematic configuration of an electronic device according to an embodiment.
Figure 1:

FIG. 1 is a diagram illustrating an example of an outline of an electronic device according to an embodiment. The electronic device 1 exemplified is a smartphone. However, in addition to the smartphone, various mobile terminal devices such as a tablet terminal and a laptop, and imaging devices such as a digital camera and a video camera may be used as the electronic device 1.

A user of the electronic device 1 is referred to as a user U in the drawing. FIG. 1 illustrates a plurality of the electronic devices 1 used by a plurality of the users U. Each of the users U and each of the electronic devices 1 are illustrated as an electronic device 1-1 used by a user U1 and an electronic device 1-2 used by a user U2 so that each of the users U and each of the electronic devices 1 can be distinguished.

Figure 2:
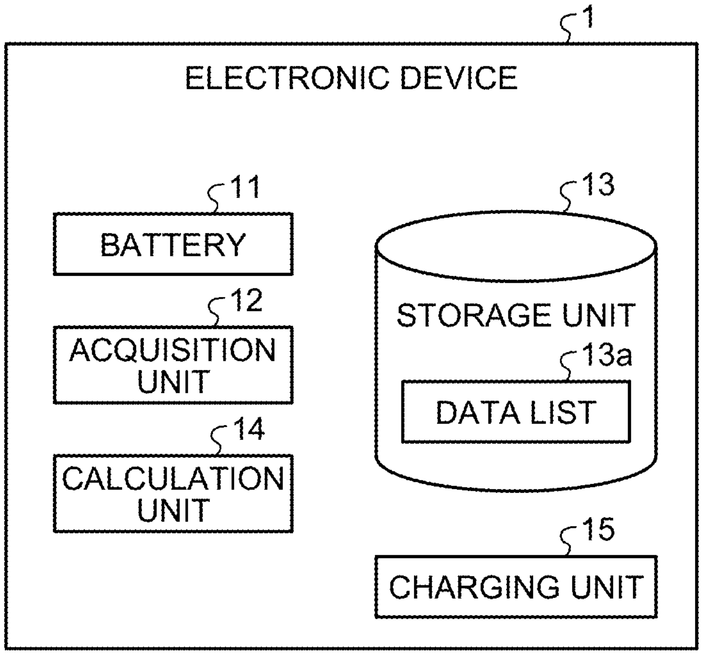
FIG. 2 is a diagram illustrating an example of a schematic configuration of the electronic device.

FIG. 2 is a diagram illustrating an example of a schematic configuration of an electronic device. The electronic device 1 includes a battery 11, an acquisition unit 12, a storage unit 13, a calculation unit 14, and a charging unit 15.

The battery 11 is a secondary battery such as a lithium ion battery. The battery 11 is fully charged so as to have a residual capacity corresponding to a set charging voltage. Charging is performed, for example, by connecting the electronic device 1 to a charger (external power supply) not illustrated.

Several terms relating to charging of the battery 11 will be described.

A "battery capacity" is a residual capacity of the fully charged battery 11.

A "maximum charging voltage" is a charging voltage for maximizing the battery capacity.

A "previous charging voltage" is a charging voltage in a previous charging period of the battery 11.

A "residual capacity value" is an absolute value of the residual capacity, and an example of the unit is mAh. The residual capacity value in a fully charged state increases as the charging voltage increases.

A "residual capacity rate" is a relative value of the residual capacity, and an example of the unit is % (percent). The residual capacity rate in the fully charged state is 100% regardless of the charging voltage.

A "used capacity" is an index corresponding to the "residual capacity" (opposite to the "residual capacity"), and is a value obtained by subtracting the residual capacity from the battery capacity. This can also be said to be an amount of power used during a use period.

A "used capacity value" is an absolute value of the used capacity, and an example of the unit is mAh.

A "used capacity rate" is a relative value of the used capacity, and an example of the unit is %.

"Caring charging" is charging of the battery 11 at a charging voltage (calculated by the calculation unit 14 described later) that suppresses battery deterioration.

The acquisition unit 12 acquires satisfaction level information of the user U regarding the battery 11 of the electronic device 1. The satisfaction level information is information in which a residual capacity (for example, a residual capacity rate) of the battery 11 and a user satisfaction level with the residual capacity are associated with each other.

The acquisition unit 12 acquires the satisfaction level information at each predetermined timing, for example, at a timing when a use period ends and a charging period starts. In a typical use case, the use period may be daytime and the charging period may be nighttime.

Figure 3:
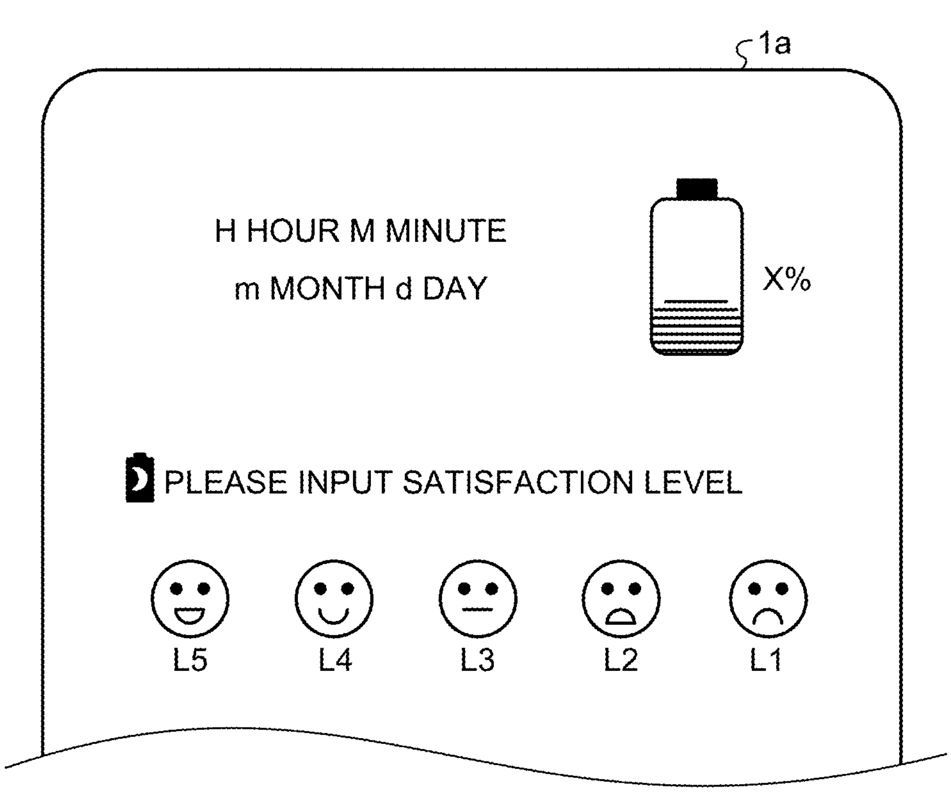
FIG. 3 is a diagram illustrating an example of acquisition of satisfaction level information.

FIG. 3 is a diagram illustrating an example of acquisition of the satisfaction level information. An operation screen as illustrated is displayed on a display screen 1*a* of the electronic device 1. "m month d day" and "H hour M minute" indicate the current date and time. "X %" indicates a current residual capacity rate of the battery 11.

In an item "Please input satisfaction level", the user satisfaction level is input by a user operation such as tapping. In this example, a satisfaction level L1 to a satisfaction level L5 are displayed in a selectable manner, and the selected satisfaction level is input as the user satisfaction level. The input user satisfaction level is acquired by the acquisition unit 12 in association with the residual capacity rate X %.

The satisfaction level L1 to the satisfaction level L5 are examples of a plurality of satisfaction levels indicating dissatisfaction to satisfaction in stages. In the sense of the user U, the satisfaction level L1 is expressed as "very dissatisfied", the satisfaction level L2 as "slightly dissatisfied", the satisfaction level L3 as "satisfied", the satisfaction level L4 as "quite satisfied", and the satisfaction level L5 as "very satisfied". Of course, other expressions may be used.

The satisfaction levels L1 to L5 include at least a satisfaction level indicating dissatisfaction and a satisfaction level indicating satisfaction. The satisfaction level indicating dissatisfaction may include a plurality of satisfaction levels indicating dissatisfaction in stages. The satisfaction level indicating satisfaction may also include a plurality of satisfaction levels indicating satisfaction in stages. In this example, the satisfaction level L1 and the satisfaction level L2 are satisfaction levels indicating dissatisfaction and are the plurality of satisfaction levels indicating dissatisfaction in stages. The satisfaction level L3 to the satisfaction level L5 are satisfaction levels indicating satisfaction, and are the plurality of satisfaction levels indicating satisfaction in stages.

Among the satisfaction level L1 and the satisfaction level L2 indicating dissatisfaction, the satisfaction level L2 is the most satisfactory satisfaction level (close to the satisfaction level L3 in this example). Therefore, not falling below the satisfaction level L2 can be regarded as one of the goals for satisfying the user U.

Although not illustrated in FIG. 3, the acquisition unit 12 may acquire information on the residual capacity (more specifically, the residual capacity value) after the previous charging together with the satisfaction level information. The battery capacity after the previous charging is grasped (managed) by, for example, the charging unit 15 to be described later, and is acquired from the charging unit 15.

Returning to FIG. 2, the storage unit 13 stores various information used for processing executed by the electronic device 1. For example, the storage unit 13 stores the satisfaction level information acquired by the acquisition unit 12. Since the satisfaction level information is acquired every predetermined period (for example, every use period) as described above, the plurality of pieces of satisfaction level information acquired by the acquisition unit 12 is accumulated in the storage unit 13. The plurality of pieces of satisfaction level information is stored in, for example, a list format. The list to be saved is referred to as a data list 13*a*.

Figures 4, 5:
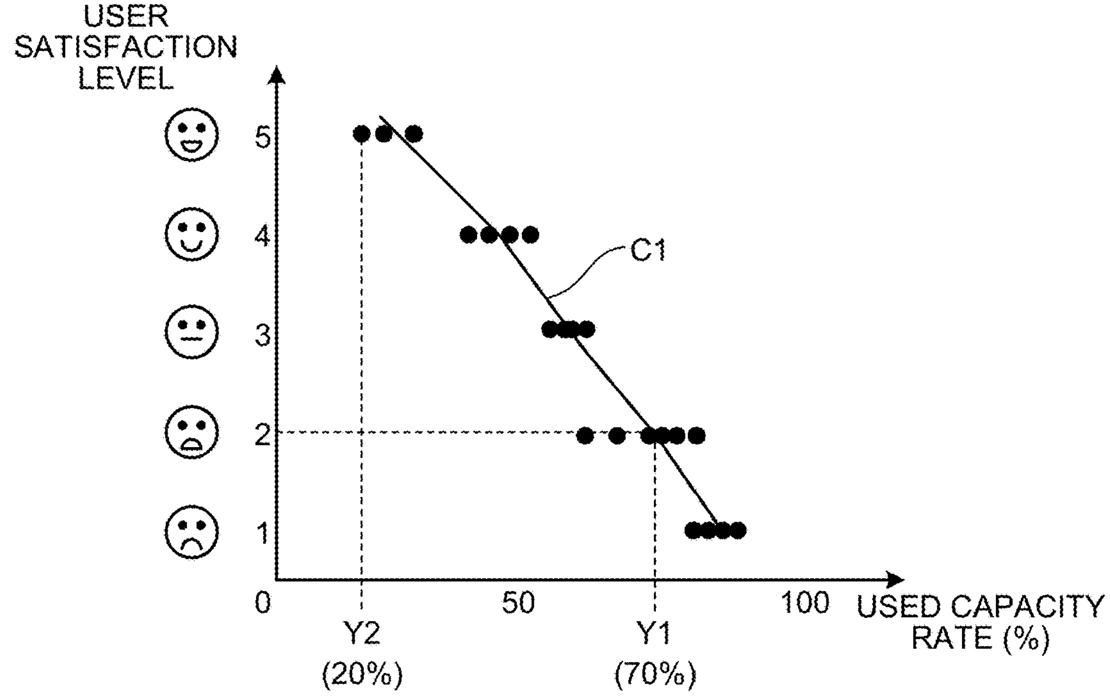
FIG. 4 is a diagram illustrating an example of a data list.
FIG. 5 is a diagram illustrating an example of calculation of a charging voltage.

FIG. 4 is a diagram illustrating an example of the data list. The data list 13*a* describes the user satisfaction level and the residual capacity (residual capacity rate in this example) in association with each other. The residual capacity rate associated with each of the satisfaction level L1 to the satisfaction level L5 is exemplified as a residual capacity rate X1 to a residual capacity rate X5.

Returning to FIG. 2, the calculation unit 14 calculates the charging voltage of the battery 11 based on the plurality of pieces of satisfaction level information acquired and accumulated by the acquisition unit 12 (stored in the storage unit 13). The plurality of pieces of satisfaction level information used for the calculation may be all the plurality of pieces of satisfaction level information acquired by the acquisition unit 12 so far, or may be a plurality of pieces of satisfaction level information acquired by the acquisition unit 12 within a specific period (for example, a period from the present to a predetermined period before).

In the present embodiment, the calculation unit 14 calculates, as a charging voltage of the battery 11, a voltage at which the battery 11 is charged until the battery 11 has a residual capacity (battery capacity) that makes it difficult for a subsequent user satisfaction level to fall below a specific satisfaction level.

The specific satisfaction level may be the satisfaction level L2. As a result, there is an effect that the user satisfaction level is less likely to become the satisfaction level (the satisfaction level L1 and the satisfaction level L2) indicating dissatisfaction. Alternatively, the specific satisfaction level may be a satisfaction level between the satisfaction level L2 and the satisfaction level L3. By setting the specific satisfaction level slightly higher than the satisfaction level L2 (by providing a margin), the above-described effect can be enhanced.

The calculation unit 14 may calculate a voltage at which the battery 11 is charged until the battery 11 has a residual capacity at which the user satisfaction level when assuming that an amount of power (used capacity) used in the past arbitrary use period of the battery 11 becomes the specific satisfaction level. As a result, the battery 11 can be charged at a charging voltage as low as possible within a range where the user satisfaction level is highly likely not to fall below the specific satisfaction level. The arbitrary used capacity may be selected from the largest use capacity, the most recent used capacity, and the like, for example, except for a use period in which battery capacity limitation release described later is performed.

Hereinafter, unless otherwise specified, the specific satisfaction level will be described as the satisfaction level L2.

FIGS. 5 to 8 are diagrams illustrating examples of calculation of the charging voltage. FIG. 5 illustrates a plurality of plots indicating a relationship between the used capacity and the user satisfaction level. A horizontal axis represents the used capacity rate. A vertical axis indicates the user satisfaction level. The used capacity rate is calculated by the calculation unit 14 by subtracting the residual capacity rate included in the satisfaction level information from 100%.

The calculation unit 14 calculates an average value or a median value (Hereinafter, it is also referred to as an "average value or the like".) of a plurality of the used capacity rates for each user satisfaction level. In this example, the calculation unit 14 calculates an average value or the like of the used capacity rates for each of the satisfaction level L1 to the satisfaction level L5.

The calculation unit 14 calculates an approximate line C1 indicating a relationship between the plurality of used capacity rates and the user satisfaction level. For example, the calculation unit 14 calculates a line passing through the average value or the like of the used capacity rates of each of the satisfaction level L1 to the satisfaction level L5 as the approximate line C1. An example of the approximate line C1 is an approximate line passing through the average value or the like of the used capacity rates of each of the satisfaction level L1 to the satisfaction level L5. Another example of the approximate line C1 is an approximate line in which coefficients and the like are fitted such that a difference from an average value and the like of each of the satisfaction level L1 to the satisfaction level L5 is minimized. Not limited thereto, various approximate lines may be calculated as the approximate line C1.

The calculation unit 14 calculates a used capacity rate corresponding to the satisfaction level L2. For example, the calculation unit 14 uses the previously calculated average value or the like as the used capacity rate corresponding to the satisfaction level L2. Alternatively, the calculation unit 14 calculates the used capacity rate corresponding to the satisfaction level L2 based on the approximate line C1. As a result, the used capacity rate in which the plurality of pieces of satisfaction level information is appropriately reflected, and the charging voltage are calculated. In this example, the calculated used capacity rate is Y1 (70%). Note that the corresponding residual capacity rate is 30%.

The calculation unit 14 calculates a used capacity (used capacity value in this example) in a past arbitrary use period. For this purpose, the calculation unit 14 selects an arbitrary plot among the plurality of plots, and calculates the used capacity value corresponding to the used capacity rate indicated by the selected plot. In this example, the used capacity rate shown in the selected plot is Y2 (20%).

Figure 6:
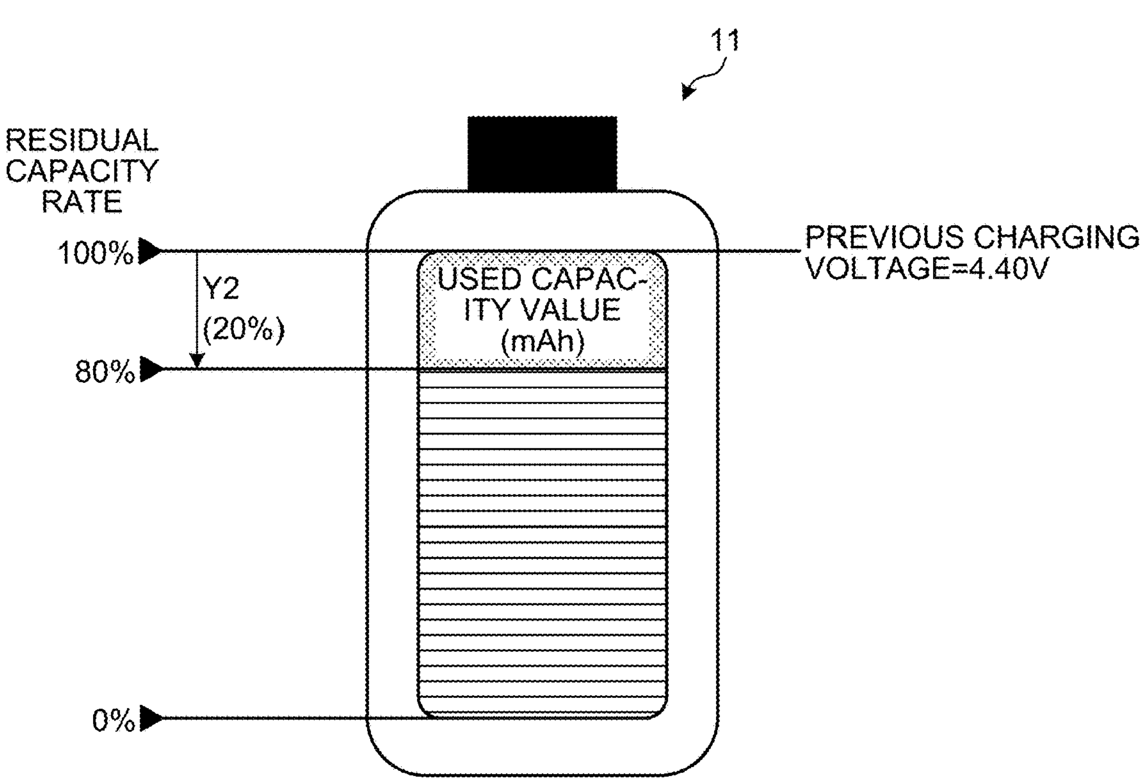
FIG. 6 is a diagram illustrating an example of calculation of the charging voltage.

An example of calculation of the used capacity value will be described. The calculation unit 14 calculates the used capacity value by multiplying the residual capacity value after the previous charge by the used capacity rate. The residual capacity value after the previous charging, that is, the battery capacity is acquired together with the satisfaction level information by the acquisition unit 12, for example, as described above. For example, as schematically illustrated in FIG. 6, a value (corresponding to an upper hatched portion) obtained by multiplying a residual capacity value (corresponding to an entire portion hatched in two types) after charging at the previous charging voltage of 4.40 V by the used capacity rate Y2 (20%) is calculated as the used capacity value.

Figure 7:
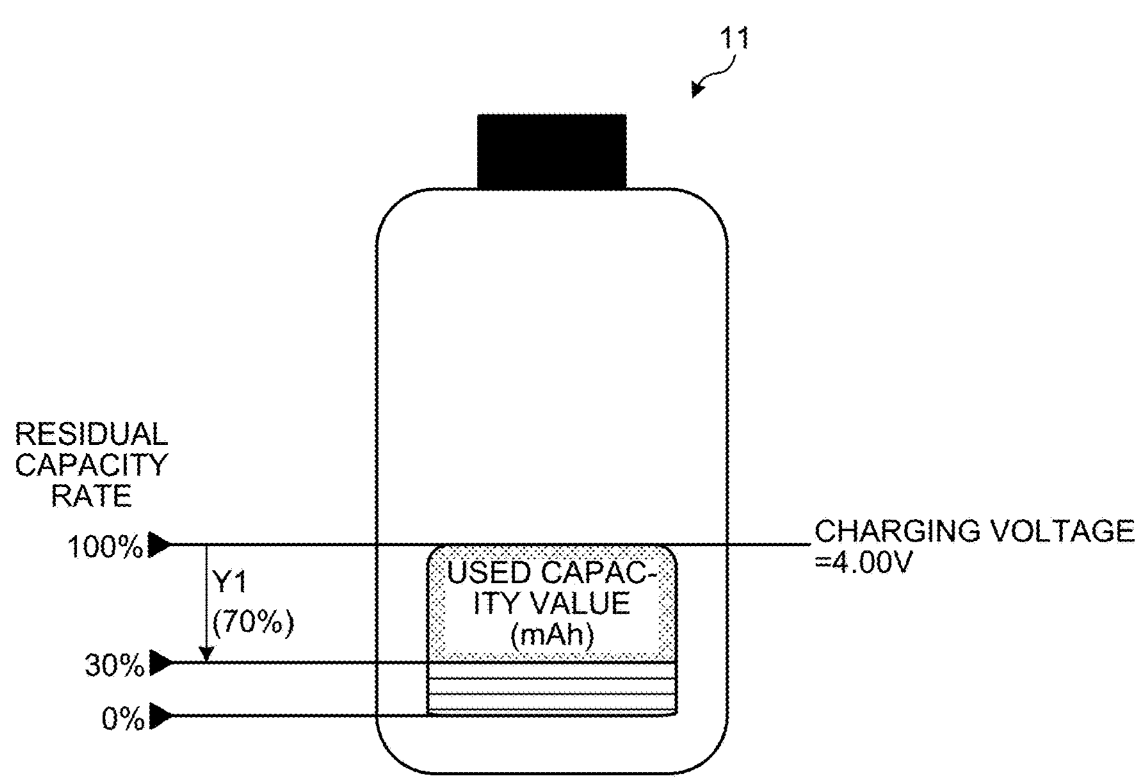
FIG. 7 is a diagram illustrating an example of calculation of the charging voltage.

The calculation unit 14 calculates, as a charging voltage, a voltage at which the battery 11 is charged until the battery 11 has a remaining residual amount (more specifically, a residual capacity ratio) at which the user satisfaction level when it is assumed that the same amount of power as the calculated used capacity value is used becomes the satisfaction level L2. For example, as schematically illustrated in FIG. 7, in a case where the fully charged battery 11 discharges the same amount of power (corresponding to the hatched portion on the upper side) as the calculated used capacity value, the charging voltage 4.00 V is calculated such that the residual capacity rate becomes 30% corresponding to the satisfaction level L2.

The calculated charging voltage can be different for each electronic device 1 (for each user U). For example, the graph illustrated in FIG. 5 may be based on the satisfaction level information from the user U1. In that case, the charging voltage calculated as illustrated in FIGS. 6 and 7 gives a battery capacity that satisfies the user U1.

Figure 8:
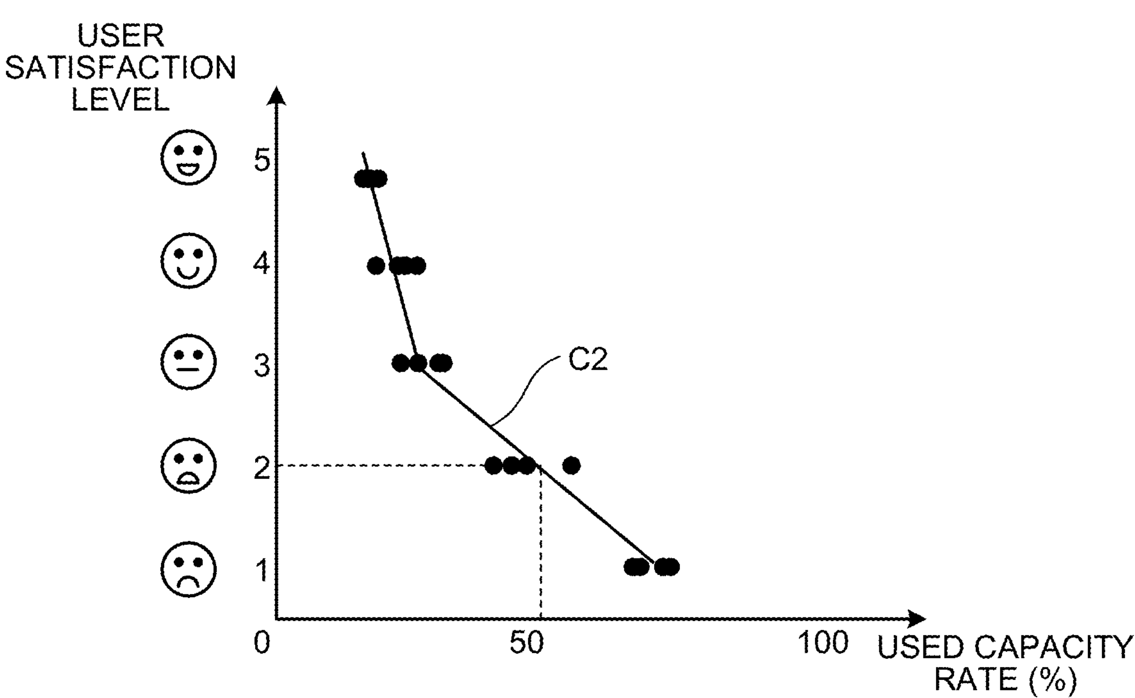
FIG. 8 is a diagram illustrating an example of calculation of the charging voltage.

On the other hand, the charging voltage that provides the battery capacity satisfying the user U2 is calculated on the basis of the satisfaction level information from the user U2. For example, a plurality of plots illustrated in FIG. 8 may be based on the satisfaction level information acquired in the electronic device 1-2 used by the user U2. The plurality of plots in FIG. 8 illustrate different trends from the plurality of plots in FIG. 5. An approximate line C2 in FIG. 8 also illustrates a behavior different from that of the approximate line C1 in FIG. 5. The charging voltage calculated therefrom gives a battery capacity that satisfies the user U2.

Returning to FIG. 2, the charging unit 15 charges the battery 11 with the charging voltage calculated by the calculation unit 14. For example, the charging unit 15 converts a voltage from the charger into the same voltage as the charging voltage calculated by the calculation unit 14, and charges the battery 11 with the converted voltage. Furthermore, the charging unit 15 manages (grasps) the residual capacity of the battery 11 by, for example, monitoring charging and discharging of the battery 11. The charging unit 15 includes, for example, a power management IC (PMIC) and the like.

According to the electronic device 1 described above, the battery 11 is charged with the charging voltage calculated so that the user satisfaction level with the battery capacity is less likely to fall below a specific satisfaction level (for example, the satisfaction level L2). The calculated charging voltage is likely to be lower than the maximum charging voltage. By charging the battery 11 with such a charging voltage, for example, battery deterioration can be suppressed as compared with the case where the battery 11 is charged with the maximum charging voltage every time. Therefore, it is possible to achieve both suppression of battery deterioration and securing of battery capacity for each user U.

As described above, the charging of the battery 11 at the charging voltage at which battery deterioration is suppressed (for example, lower than the maximum charging voltage), which is calculated by the calculation unit 14, is referred to as "caring charging". When the charging voltage in caring charging is lower than the maximum charging voltage, the battery capacity is limited accordingly. On the other hand, there is also a demand for securing a large battery capacity for a specific use period or the like. Therefore, in one embodiment, the acquisition unit 12 acquires release instruction information that instructs to release the caring charging.

Figure 9:
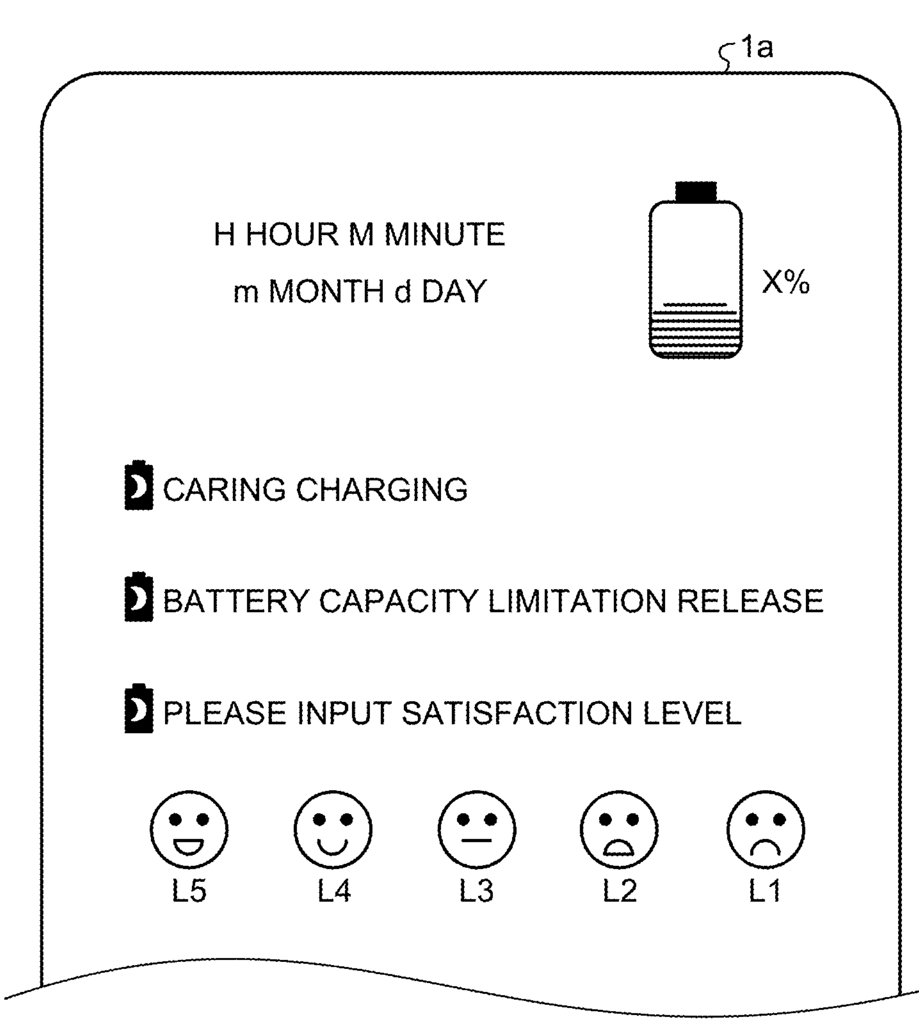
FIG. 9 is a diagram illustrating an example of acquisition of release instruction information.

FIG. 9 is a diagram illustrating an example of acquisition of the release instruction information. In comparison with FIG. 3 described above, the message "caring charging" and the item "battery capacity limitation release" are also illustrated. The message "caring charging" is a message indicating that the battery 11 is charged with a charging voltage calculated by the calculation unit 14. When the item "battery capacity limitation release" is selected, the acquisition unit 12 acquires the release instruction information.

The acquisition unit 12 may automatically acquire the release instruction information without the user operation (manual operation) as described above. For example, the acquisition unit 12 may recognize a use period in which a large amount of battery capacity is expected to be required on the basis of various information including information regarding a schedule of the user U, and automatically acquire the release instruction information. Examples of the information regarding the schedule are information indicated in Email, short message service (SMS), social networking service (SNS), or the like used by the user U.

Returning to FIG. 2, in a case where the acquisition unit 12 acquires the release instruction information, the charging unit 15 charges the battery 11 with the maximum charging voltage. Thus, the battery capacity can be secured for the next use period.

As described above, there is provided a technique in which the charging voltage can be lowered to a level at which the user U is not dissatisfied according to his/her battery capacity needs, and the charging voltage can be controlled to be returned so that a peak capacity can be obtained as needed.

Figure 10:
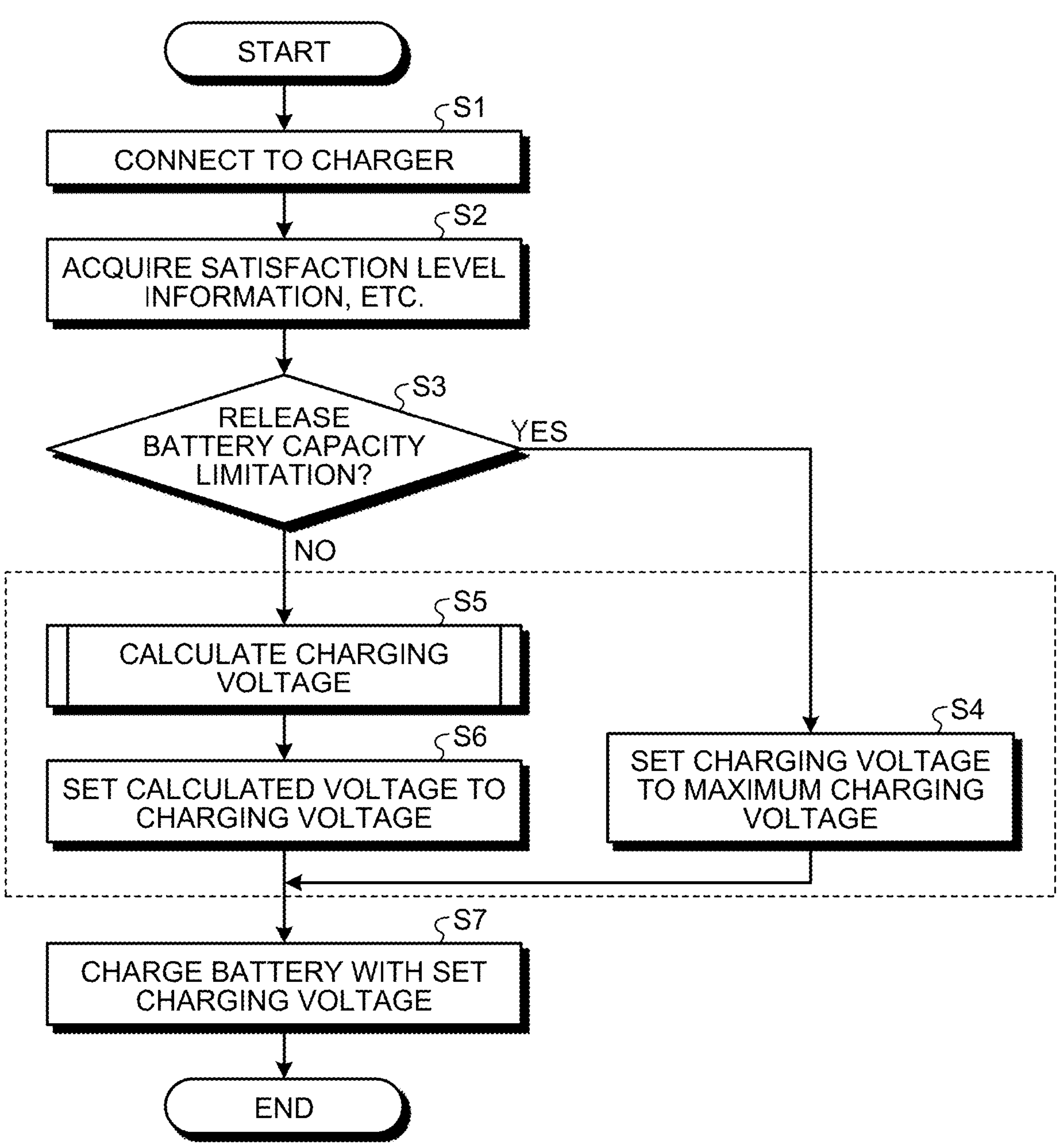
FIG. 10 is a flowchart illustrating an example of processing executed in a terminal.
Figure 11:
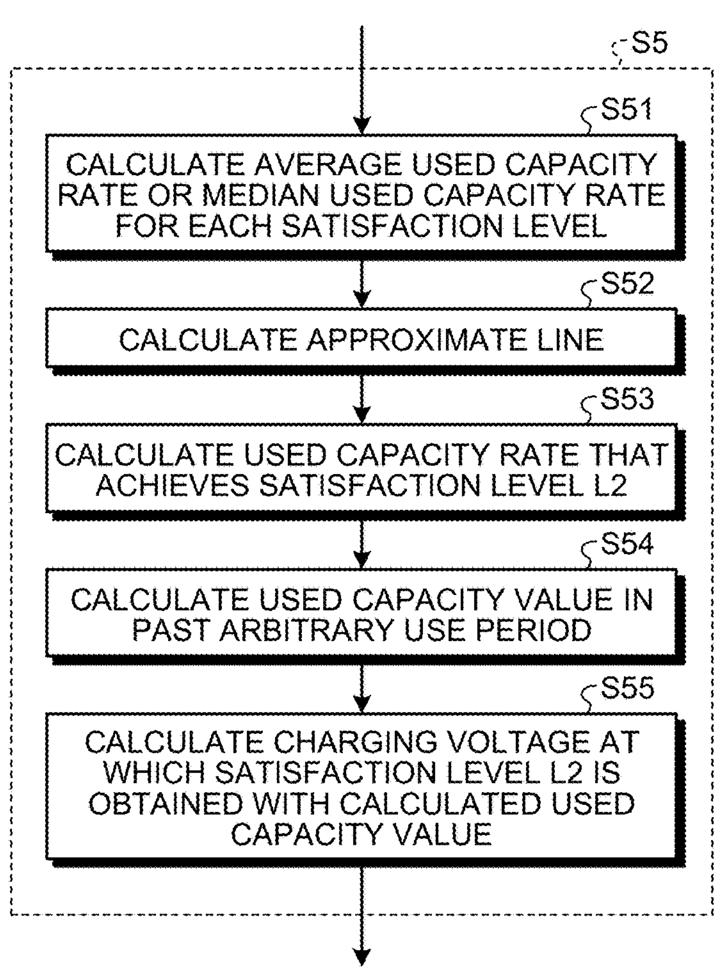
FIG. 11 is a flowchart illustrating an example of processing executed in the terminal.
Figure 12:
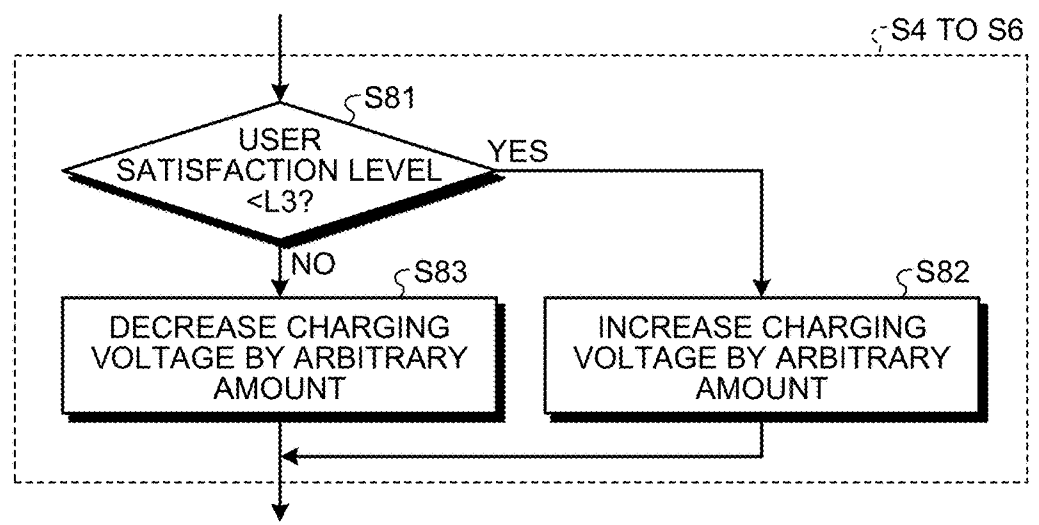
FIG. 12 is a flowchart illustrating an example of processing executed in the terminal.

FIGS. 10 to 12 are flowcharts illustrating an example of processing executed in the terminal. Referring to FIG. 10, in Step S1, it is connected to the charger. The user U1 connects electronic device 1 to the charger. The use period ends and the charging period starts.

In Step S2, the satisfaction level information and the like are acquired. The acquisition unit 12 acquires the satisfaction level information. The acquired satisfaction level information is stored in the storage unit 13 and added to the data list 13*a* of the storage unit 13. In a case where the battery capacity limitation release is selected, the release instruction information is also acquired.

In Step S3, the processing branches depending on whether or not the battery capacity limitation is released. In a case where the battery capacity limitation is released, that is, in a case where the release instruction information is acquired in Step S2 described above (Step S3: Yes), the processing proceeds to Step S4. Otherwise (Step S3: No), the processing proceeds to Step S5.

In Step S4, the charging voltage is set to the maximum charging voltage. The charging unit 15 sets the charging voltage to the maximum charging voltage.

In Step S5, the charging voltage is calculated. This processing is performed by the calculation unit 14. Referring to FIG. 11, Step S5 includes Steps S51 to S54.

In Step S51, an average used capacity rate or a median used capacity rate for each satisfaction level is calculated. As described above with reference to FIG. 5, the calculation unit 14 calculates the average value or the median value of the used capacity rates for each of the satisfaction level L1 to the satisfaction level L5.

In Step S52, an approximate line is calculated. The calculation unit 14 calculates the approximate line C1 as described above with reference to FIG. 5.

In Step S53, the used capacity rate that achieves the satisfaction level L2 is calculated. For example, the calculation unit 14 sets the average used capacity rate or the median used capacity rate calculated in Step S51 as the used capacity rate corresponding to the satisfaction level L2. Alternatively, the calculation unit 14 calculates the used capacity rate corresponding to the satisfaction level L2 using the approximate line C1 calculated in Step S52 described above. Note that, in a case where the specific satisfaction level is the satisfaction level between the satisfaction level L2 and the satisfaction level L3, the approximate line C1 is used.

In Step S54, the used capacity value in the past arbitrary use period is calculated. As described above with reference to FIGS. 5 and 6, the calculation unit 14 selects a past arbitrary used capacity rate and calculates a corresponding used capacity value.

In Step S55, the charging voltage at which the satisfaction level L2 is obtained with the calculated used capacity value is calculated. As described above with reference to FIG. 7, the calculation unit 14 calculates, as the charging voltage, a voltage at which the battery 11 is charged until the battery 11 has a remaining residual amount rate at which the user satisfaction level when it is assumed that the same power amount as the used capacity value calculated in Step S54 is used becomes the satisfaction level L2.

Returning to FIG. 10, in Step S6, the calculated voltage is set to the charging voltage. A setting unit 16 sets the voltage calculated in Step S5 described above to the charging voltage.

In Step S7, the battery is charged with the set charging voltage. The charging unit 15 charges the battery 11 with the charging voltage set in previous Step S4 or Step S6.

For example, the processing of Steps S1 to S7 as described above is repeatedly executed every predetermined period. By repeating the processing, the number of pieces of the satisfaction level information acquired and accumulated in Step S2 increases, and accordingly, the charging voltage calculated in Step S5 is brought closer to a more appropriate charging voltage that provides a battery capacity satisfying the user U1.

Incidentally, Steps S4 to S6 in FIG. 10 can also be described as Steps S81 to S83 as illustrated in FIG. 12 from the viewpoint of charging voltage change. That is, in a case where the user satisfaction level is less than the satisfaction level L3 (Step S81: Yes), the charging voltage is increased by an arbitrary amount (Step S82), and otherwise (Step S81: No), the charging voltage is decreased by an arbitrary amount. For example, in this manner, the charging voltage is brought close to a voltage at which the user satisfaction level does not fall below the satisfaction level L2, that is, a more appropriate charging voltage that provides a battery capacity that satisfies the user U1. Note that, in this example, the charging voltage changes immediately when the user satisfaction level becomes less than the satisfaction level L3. However, it is also possible to perform control such that the charging voltage changes for the first time in a case where the user satisfaction level is continuously less than the satisfaction level L3. The continuous number may be appropriately set.

Figure 13:
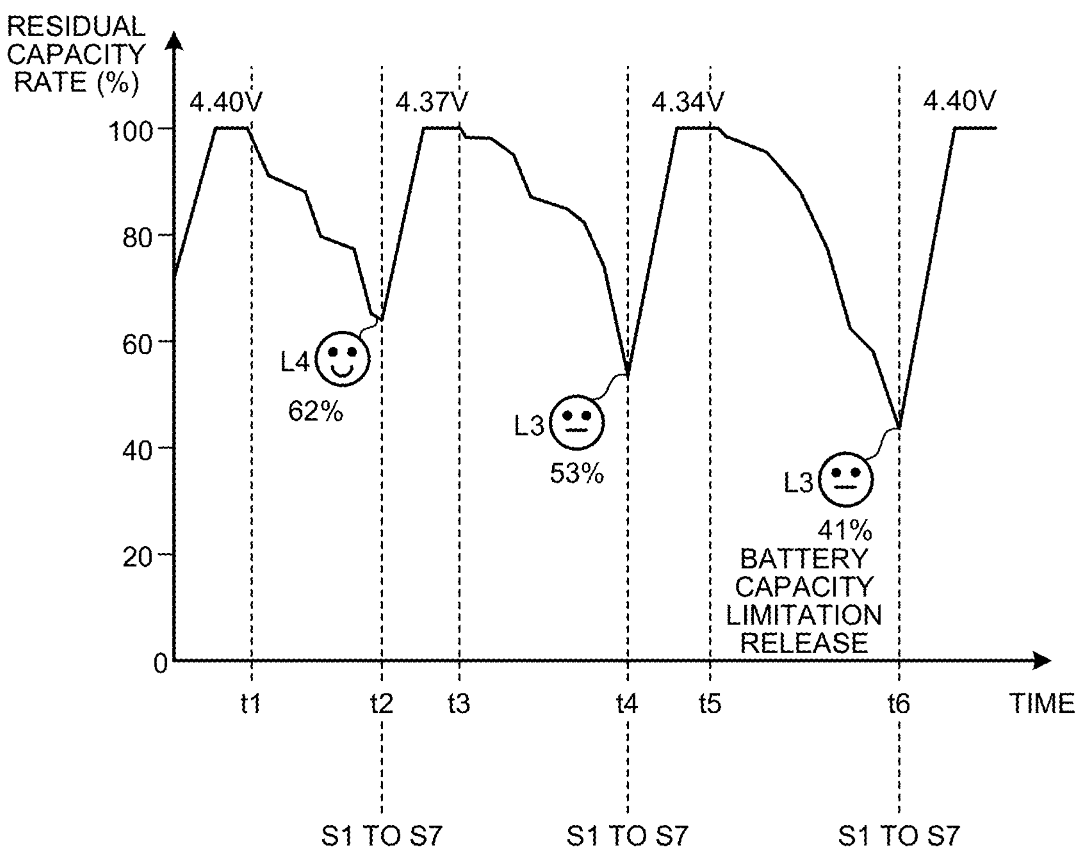
FIG. 13 is a diagram illustrating an example of a charging voltage change.

FIG. 13 is a diagram illustrating an example of the charging voltage change. A horizontal axis of the graph represents time, and a vertical axis represents a residual capacity rate (%). Initially, the battery is charged at a charging voltage of 4.40 V to be in a fully charged state.

At time t1, the charging period ends and the use period starts. The residual capacity rate decreases.

At time t2, the use period ends and the charging period starts. The residual capacity rate at this time is 62%, and the user satisfaction level is the satisfaction level L4. The processing of Steps S1 to S7 described above with reference to FIG. 10 is executed. As a result, in this example, the battery 11 is charged at 4.37 V lower than the previous charging voltage 4.40 V.

At time t3, the charging period ends and the use period starts. The residual capacity rate decreases.

At time t4, the use period ends and the charging period starts. The residual capacity rate at this time is 53%, and the user satisfaction level is the satisfaction level L3. In this example, the battery 11 is charged at 4.34 V lower than the previous charging voltage of 4.37 V.

At time t5, the charging period ends and the use period starts. The residual capacity rate decreases.

At time t6, the use period ends and the charging period starts. The residual capacity rate at this time is 41%, and the user satisfaction level is the satisfaction level L3. However, here, the battery capacity limitation release is selected, and the battery 11 is charged at the maximum charging voltage (4.40 V in this example).

For example, as described above, the charging voltage is controlled according to the user satisfaction level.

Figure 14:
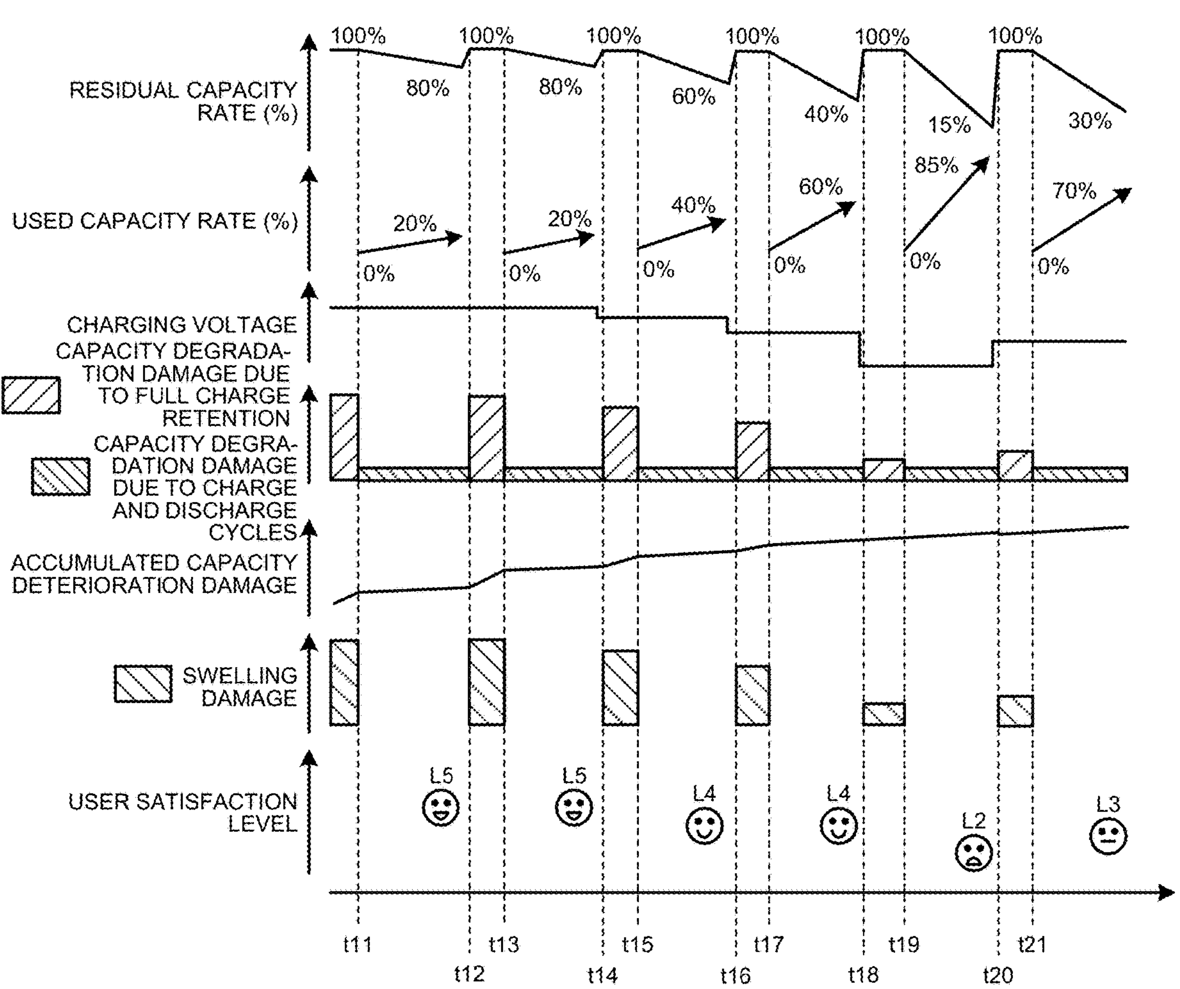
FIG. 14 is a diagram schematically illustrating battery deterioration.

FIG. 14 is a diagram schematically illustrating battery degradation. The "residual capacity rate (%)" and the "usage capacity rate (%)" depend on how the user U uses the electronic device 1. The "charging voltage" is calculated and controlled as described above. A "capacity degradation damage due to full charge retention" and a "capacity degradation damage due to charge and discharge cycles" increase or decrease according to how the user U uses the electronic device 1. An "accumulated capacity deterioration damage" is accumulated according to how the user U uses the electronic device 1. A "swelling damage" increases or decreases according to how the user U uses the electronic device 1. The "user satisfaction level" is fed back from the user U as described above.

An initial state (before time t11) is the charging period and the fully charged state (residual capacity rate is 100%). For this reason, the capacity deterioration damage due to full charge retention and the swelling damage occur. Among them, a accumulated capacity deterioration damage increases by an amount of the capacity deterioration damage due to the full charge retention.

Note that the capacity degradation damage due to full charge retention increases as the charging voltage increases. This damage may be significantly greater at higher charging voltages than other damage, e.g., a cyclic damage. Note that the same applies to the swelling damage.

At time t11, the charging period ends and the use period starts. The residual capacity rate drops to 80%, thus increasing the used capacity rate to 20%. In this example, the user satisfaction level is the satisfaction level L5, and the battery 11 is charged at the same charging voltage as the previous charging voltage, and is fully charged at time t12. A cycle damage occurs between time t11 and time t12. The accumulated capacity deterioration damage increases accordingly.

The fully charged state continues from time t12 to time t13. The capacity deterioration damage due to full charge retention occurs, and the accumulated capacity deterioration damage increases.

At time t13, the charging period ends and the use period starts. The residual capacity rate drops to 80%, thus increasing the used capacity rate to 20%. In this example, the user satisfaction level is the satisfaction level L5, and the battery 11 is charged at a charging voltage lower than the previous charging voltage, and is fully charged at time t14. A cycle damage occurs between time t13 and time t14. The accumulated capacity deterioration damage increases accordingly.

The fully charged state continues from time t14 to time t15. The capacity deterioration damage due to full charge retention occurs, and the accumulated capacity deterioration damage increases. However, as the charging voltage becomes lower than the previous charging voltage, the capacity deterioration damage due to full charge retention also decreases, and an increase in the accumulated capacity deterioration damage is suppressed.

At time t15, the charging period ends and the use period starts. The residual capacity rate drops to 60%, thus increasing the used capacity rate to 40%. In this example, the user satisfaction level is the satisfaction level L4, and the battery 11 is charged at a charging voltage lower than the previous charging voltage, and is fully charged at time t16. A cycle damage occurs between time t15 and time t16. The accumulated capacity deterioration damage increases accordingly.

The fully charged state continues from time t16 to time t17. The capacity deterioration damage due to full charge retention occurs, and the accumulated capacity deterioration damage increases. However, as the charging voltage becomes lower than the previous charging voltage, the capacity deterioration damage due to the full charge retention is further reduced, and the increase in the accumulated capacity deterioration damage is further suppressed.

At time t17, the charging period ends and the use period starts. The residual capacity rate drops to 40%, thus increasing the used capacity rate to 60%. In this example, the user satisfaction level is the satisfaction level L4, and the battery 11 is charged at a charging voltage lower than the previous charging voltage, and is fully charged at time t18. Between time t17 and time t18, a cycle damage occurs, and the accumulated capacity deterioration damage increases.

The fully charged state continues from time t18 to time t19. The capacity deterioration damage due to full charge retention occurs, and the accumulated capacity deterioration damage increases. However, as the charging voltage becomes lower than the previous charging voltage, the capacity deterioration damage due to the full charge retention is further reduced, and the increase in the accumulated capacity deterioration damage is further suppressed.

At time t19, the charging period ends and the use period starts. The residual capacity rate drops to 15%, thus increasing the used capacity rate to 85%. In this example, the user satisfaction level is the satisfaction level L2, and the battery 11 is charged at a charging voltage higher than the previous charging voltage, and is fully charged at time t20. Between time t19 and time t20, a cycle damage occurs, and the accumulated capacity deterioration damage increases.

The fully charged state continues from time t20 to time t21. The capacity deterioration damage due to full charge retention occurs, and the accumulated capacity deterioration damage increases.

At time t21, the charging period ends and the use period starts. The residual capacity rate drops to 30%, thus increasing the used capacity rate to 70%. In this example, the user satisfaction level is the satisfaction level L3. Since it is not illustrated hereinafter, the description thereof is omitted.

For example, as described above, since the battery 11 is charged at a charging voltage as low as possible in a range in which the user satisfaction level is less likely to fall below the satisfaction level L2, it is possible to particularly suppress capacity deterioration damage due to full charge retention and to suppress an increase in the accumulated capacity deterioration damage. Note that the swelling damage is also suppressed.

1.2. Embodiment of Charging System

Figure 15:
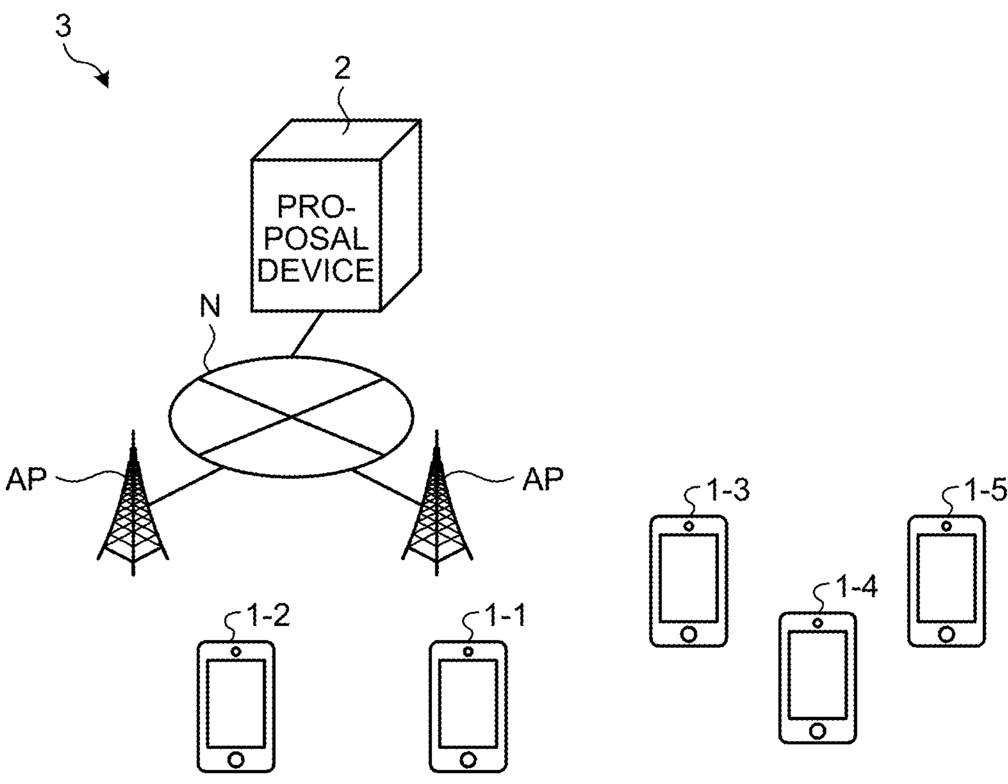
FIG. 15 is a diagram illustrating an example of a schematic configuration of a charging system according to an embodiment.

FIG. 15 is a diagram illustrating an example of a schematic configuration of a charging system according to an embodiment. An exemplary charging system 3 includes a plurality of electronic devices 1 and a proposal device 2. Examples of the plurality of electronic devices 1 include an electronic device 1-1, an electronic device 1-2, an electronic device 1-3, an electronic device 1-4, and an electronic device 1-5. The proposal device 2 is configured to be able to communicate with each of the plurality of electronic devices 1. In this example, the plurality of electronic devices 1 and the proposal device 2 communicate with each other via an access point AP and a network N. Information acquired or used by the plurality of electronic devices 1 and the proposal device 2 is transmitted and received between the plurality of electronic devices 1 and the proposal device 2 as necessary.

Figure 16:
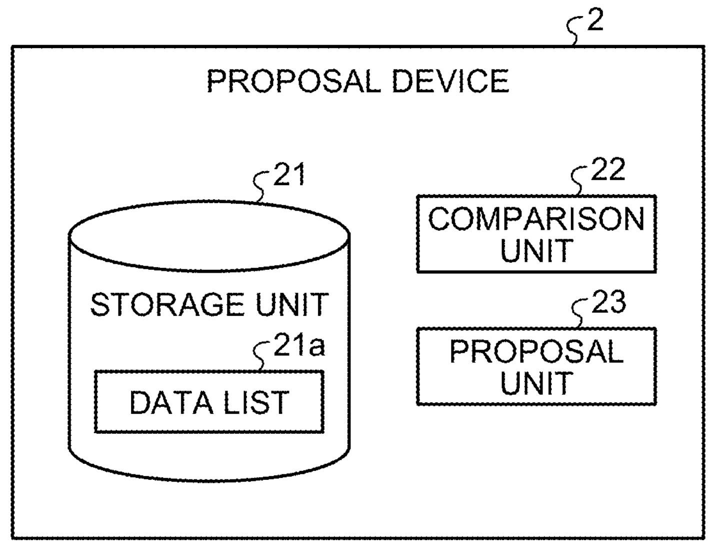
FIG. 16 is a diagram illustrating an example of a schematic configuration of a proposal device.

FIG. 16 is a diagram illustrating an example of a schematic configuration of the proposal device. The proposal device 2 includes a storage unit 21, a comparison unit 22, and a proposal unit 23.

The storage unit 21 stores the satisfaction level information acquired and accumulated in each of the plurality of electronic devices 1. A data list 21*a* is exemplified as the information to be stored.

Figure 17:
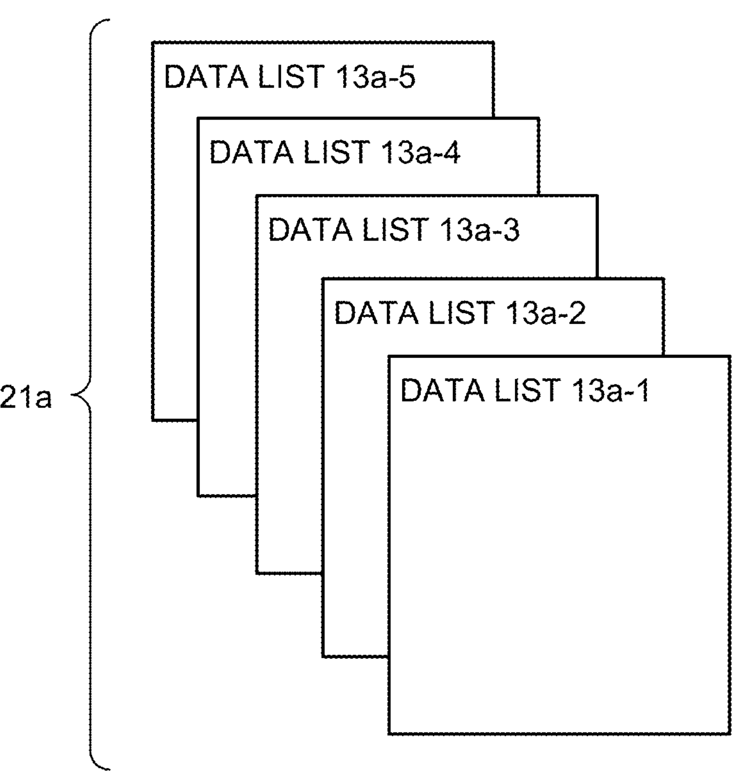
FIG. 17 is a diagram illustrating an example of a data list.

FIG. 17 is a diagram illustrating an example of the data list. The data list 21*a* includes a data list 13*a* (FIG. 4) of each of the plurality of electronic devices 1. The data lists of the electronic device 1-1 to the electronic device 1-5 are referred to as a data list 13*a*-1 to a data list 13*a*-5 so that the data lists can be distinguished from each other.

Returning to FIG. 16, the comparison unit 22 compares the data list 13*a* (satisfaction level information) of, for example, one electronic device 1 (first electronic device) among the plurality of electronic devices 1 with the data list 13*a* of each of the other electronic devices 1. An example of the comparison result is a result of similarity determination. For example, similarity of the average value, the median value, the approximate line, or the like indicating a relationship between the used capacity rate and the user satisfaction level as described above with reference to FIG. 5 may be determined. In a case where a difference between the average values or the median values, a difference between the coefficients of the approximate lines, or the like is less than a threshold value, it may be determined that the average values or the median values are similar to each other, and otherwise, it may be determined that the average values or the median values are not similar to each other. Not limited to this, various known methods that can be used for the similarity determination of the satisfaction level information may be used. The electronic device 1 from which the satisfaction level information similar to the satisfaction level information of the first electronic device has been acquired is referred to as a second electronic device. Here, it is assumed that the first electronic device is the electronic device 1-1 and the second electronic device is the electronic device 1-3.

The proposal unit 23 proposes charging with a charging voltage calculated as a voltage for charging the battery 11 of the electronic device 1-1 to a user of the electronic device 1-3. The charging voltage may be calculated by the calculation unit 14 of the corresponding electronic device 1 and transmitted to the proposal device 2, or may be similarly calculated by the proposal unit 23. At the time of proposal, for example, the proposal unit 23 transmits information (proposal information) notifying that charging is proposed to the electronic device 1-3. The electronic device 1-3 presents the proposal information to the user of the electronic device 1-3. When the proposal indicated in the proposal information is accepted by a user operation or the like, the proposal unit 23 transmits information on the charging voltage of the electronic device 1-1 to the electronic device 1-3. The charging unit 15 of the electronic device 1-3 charges the battery 11 with the same charging voltage as the charging voltage of the electronic device 1-1.

For example, as described above, it is possible to propose charging with a charging voltage of another electronic device 1 (a caring charging condition) and to charge the battery 11 with the charging voltage. In this way, it is also possible to achieve both suppression of battery deterioration and securing of battery capacity for each user U.

Note that the second electronic device (electronic device 1-3 in this example) among the plurality of electronic devices 1 may not have the function of the calculation unit 14.

The electronic device 1-3 to be proposed by the proposal unit 23 desirably includes a battery of the same type (such as a model number) as the battery 11 of the electronic device 1-1, and is an electronic device of the same type as the electronic device 1-1. As a result, the charging voltage (customized caring charging condition) calculated by the electronic device 1-1 can also be appropriately applied to the electronic device 1-3.

The proposal unit 23 may propose the charging voltage calculated from the plurality of data lists 13*a* to the user (entire user) of each electronic device. For example, the charging voltage may be calculated in the same manner as before using a data list in which the plurality of data lists 13*a* are integrated. The first electronic device and the second electronic device in this case are both a plurality of electronic devices.

2. EXAMPLE OF HARDWARE CONFIGURATION

Figure 18:
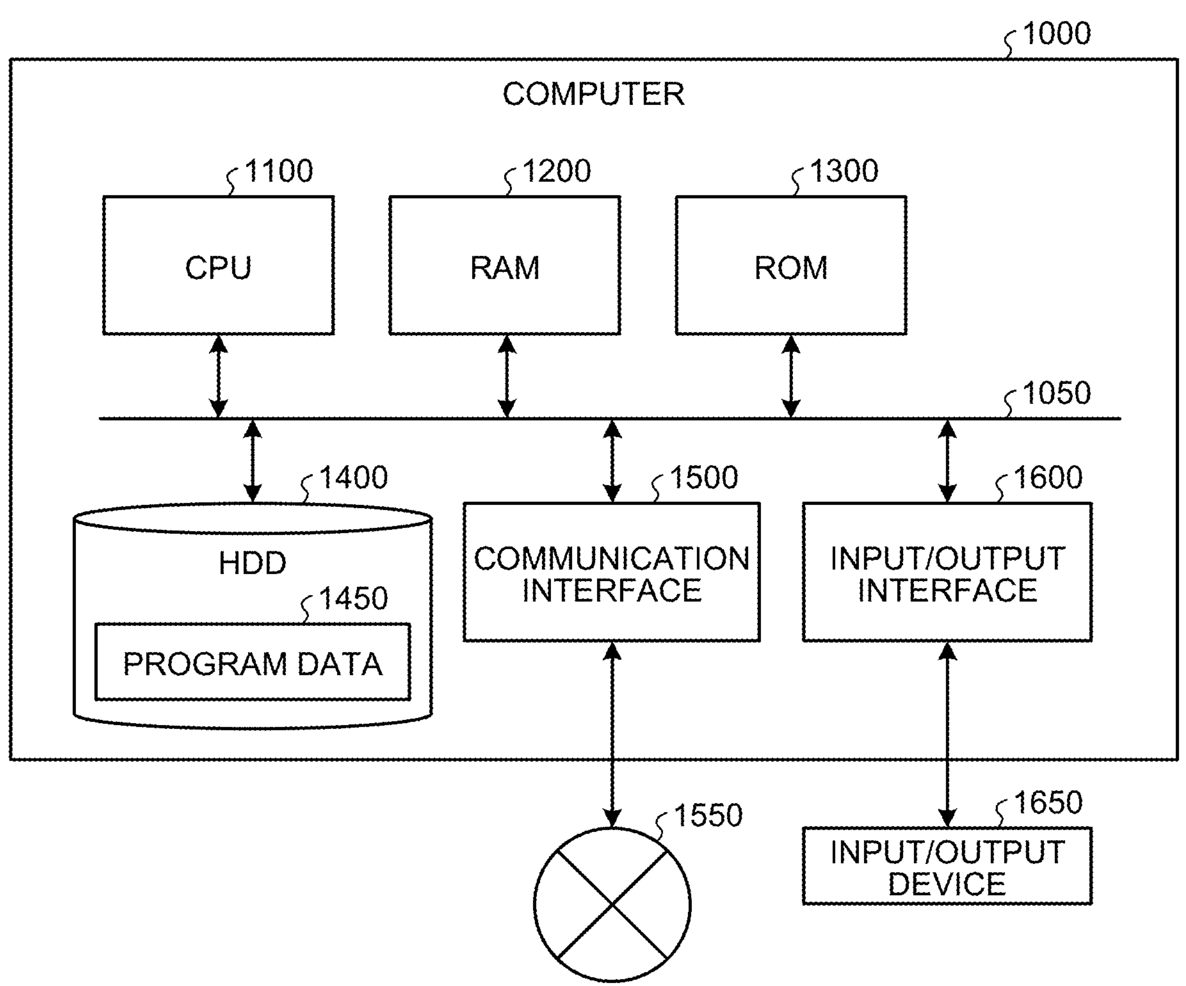
FIG. 18 is a diagram illustrating an example of a hardware configuration.

FIG. 18 is a diagram illustrating an example of a hardware configuration of the device. The device referred to herein indicates the electronic devices 1 and the proposal device 2 described above. In this example, the device is implemented by a computer 1000. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from other device or transmits data generated by the CPU 1100 to other device via the communication interface 1500.

The input/output interface 1600 is an interface for connecting an input/output device 1650 and the computer 1000. For example, the CPU 1100 receives data from an input device such as a keyboard and a mouse via the input/output interface 1600. Furthermore, the CPU 1100 transmits data to an output device such as a display, a speaker, or a printer via the input/output interface 1600. Furthermore, the input/output interface 1600 may function as a media interface that reads a program or the like recorded in a predetermined recording medium (media). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the electronic device 1, the CPU 1100 of the computer 1000 realizes the functions of the acquisition unit 12, the calculation unit 14, and the like by executing a program loaded on the RAM 1200. Furthermore, the HDD 1400 also stores programs and data in the storage unit 13. Note that the CPU 1100 reads the program data 1450 from the HDD 1400 and executes the program data 1450, but as another example, these programs may be acquired from another device via the external network 1550.

For example, in a case where the computer 1000 functions as the proposal device 2, the CPU 1100 of the computer 1000 realizes the functions of the comparison unit 22, the proposal unit 23, and the like by executing a program loaded on the RAM 1200. Furthermore, the HDD 1400 also stores programs and data in the storage unit 21. Note that the CPU 1100 reads the program data 1450 from the HDD 1400 and executes the program data 1450, but as another example, these programs may be acquired from another device via the external network 1550.

3. MODIFICATION EXAMPLES

The disclosed technique is not limited to the above embodiments. For example, in the above embodiment, an example in which the electronic device 1 includes the storage unit 13 and the calculation unit 14 has been described. However, some or all of the functions of the storage unit 13 and/or the calculation unit 14 may be provided outside the electronic device 1, for example, in an external server. The electronic device 1 may use the functions of the storage unit 13 and/or the calculation unit 14 by communicating with the external server.

In the above embodiment, an example has been described in which the user satisfaction level is represented by the five satisfaction levels of the satisfaction level L1 to the satisfaction level L5. However, the satisfaction level of any aspect may be adopted as long as the satisfaction level indicating the satisfaction and the satisfaction level indicating the dissatisfaction can be distinguished from each other.

As described at the beginning, the electronic device 1 is not limited to a smartphone, and may be various mobile devices (tablet terminal, laptop, etc.) and imaging devices (digital camera, video camera, etc.).

4. EFFECTS

The electronic device 1 described above is specified as follows, for example. As described with reference to FIGS. 1 to 4 and the like, the electronic device 1 includes the battery 11, the acquisition unit 12, and the charging unit 15. The acquisition unit 12 acquires, at each predetermined timing, satisfaction level information in which a residual capacity of the battery 11 is associated with a user satisfaction level for the residual capacity. Based on a plurality of the pieces of satisfaction level information acquired and accumulated by the acquisition unit 12, the charging unit 15 charges the battery 11 with a charging voltage calculated as a voltage for charging the battery 11 until the battery 11 has a residual capacity that makes it difficult for a subsequent user satisfaction level to fall below a specific satisfaction level.

According to the electronic device 1, the battery 11 is charged with the charging voltage calculated so that the user satisfaction level with the residual capacity of the battery 11 is less likely to fall below the specific satisfaction level. The calculated charging voltage is likely to be lower than the maximum charging voltage. By charging the battery 11 with such a charging voltage, for example, battery deterioration can be suppressed as compared with the case where the battery 11 is charged with the maximum charging voltage every time. Therefore, it is possible to achieve both suppression of battery deterioration and securing of battery capacity for each user U.

As described with reference to FIG. 3 and the like, the user satisfaction level may be selected from a plurality of satisfaction levels (for example, the satisfaction level L1 to the satisfaction level L5) indicating in stages from dissatisfaction to satisfaction, and the specific satisfaction level may be a satisfaction level (for example, the satisfaction level L2) indicating dissatisfaction among the plurality of satisfaction levels. The plurality of satisfaction levels may include a plurality of satisfaction levels (for example, the satisfaction level L1 and the satisfaction level L2) indicating dissatisfaction in stages, and the specific satisfaction level may be a satisfaction level (for example, the satisfaction level L2) that is the most satisfactory among the plurality of satisfaction levels (for example, the satisfaction level L1 to the satisfaction level L5) indicating dissatisfaction in stages. Alternatively, the specific satisfaction level may be a satisfaction level between a most satisfactory satisfaction level (for example, the satisfaction level L2) among the plurality of satisfaction levels (for example, the satisfaction level L1 and the satisfaction level L2) indicating dissatisfaction in stages and a satisfaction level (for example, the satisfaction level L3 to the satisfaction level L5) indicating satisfaction. As a result, it is possible to make it difficult for the user satisfaction level to become the satisfaction level indicating dissatisfaction.

As described with reference to FIGS. 5 to 7 and the like, the charging voltage may be calculated as a voltage for charging the battery 11 until the battery 11 has a residual capacity at which the user satisfaction level when it is assumed that an amount of power used in the past arbitrary use period of the battery 11 is used becomes a specific satisfaction level. As a result, the battery 11 can be charged at a charging voltage as low as possible within a range in which the user satisfaction level does not fall below a specific satisfaction level.

As described with reference to FIGS. 5 to 7 and the like, the charging voltage may be calculated on the basis of an average value or a median value for each user satisfaction level of a plurality of used capacities corresponding to a plurality of residual capacities acquired and accumulated by the acquisition unit 12. The charging voltage may be calculated based on an approximate line indicating a relationship between the plurality of used capacities corresponding to the plurality of residual capacities acquired and accumulated by the acquisition unit 12 and the user satisfaction level. For example, in this manner, the battery 11 can be charged with the charging voltage in which the plurality of pieces of satisfaction level information is appropriately reflected.

As described with reference to FIG. 9 and the like, the acquisition unit 12 may acquire the release instruction information instructing release of charging of the battery with the calculated charging voltage (namely, the battery capacity limitation release by caring charging), and the charging unit 15 may charge the battery 11 with the charging voltage (maximum charging voltage) for maximizing the residual capacity of the battery 11 in a case where the acquisition unit 12 acquires the release instruction information. Thus, the battery capacity can be secured for the next use period.

The charging system 3 described with reference to FIG. 15 and the like is also an aspect of the present disclosure. The charging system 3 includes the plurality of electronic devices 1 and the proposal device 2 configured to be able to communicate with each of the plurality of electronic devices 1. Each of the plurality of electronic devices 1 includes the battery 11, the acquisition unit 12 that acquires, at each predetermined timing, satisfaction level information in which a residual capacity of the battery 11 is associated with a user satisfaction level for the residual capacity, and the charging unit 15 that charges the battery 11. The plurality of electronic devices 1 includes the first electronic device (for example, the electronic device 1-1) in which the charging unit 15 charges the battery 11 with a charging voltage calculated as a voltage for charging the battery 11 until the battery 11 has a residual capacity that makes it difficult for a subsequent user satisfaction level to fall below a specific satisfaction level on the basis of the plurality of pieces of satisfaction level information acquired and accumulated by the acquisition unit 12. The proposal device 2 proposes charging at a charging voltage calculated as a voltage for charging the battery 11 of the first electronic device to a user of the second electronic device (for example, the electronic device 1-3) different from the first electronic device. For example, the proposal device 2 may propose charging at the charging voltage calculated as the voltage for charging the battery 11 of the first electronic device (for example, the electronic device 1-1) to the user of the second electronic device (for example, the electronic device 1-3) specified based on a comparison result between the plurality of pieces of satisfaction level information acquired and accumulated by the acquisition unit 12 of the first electronic device (for example, the electronic device 1-1) and the plurality of pieces of satisfaction level information acquired and accumulated by the acquisition unit 12 of each of the other electronic devices (for example, the electronic device 1-2 to the electronic device 1-5). In this way, it is also possible to achieve both suppression of battery deterioration and securing of battery capacity for each user U.

The charging method described with reference to FIG. 10 and the like is also an aspect of the present disclosure. The charging method includes: acquiring, at each predetermined timing, satisfaction level information in which a residual capacity of a battery of an electronic device and a user satisfaction level with the residual capacity are associated with each other (Step S2); and charging the battery 11 with a charging voltage calculated as a voltage for charging the battery 11 until the battery 11 has a residual capacity that makes it difficult for a subsequent user satisfaction level to fall below a specific satisfaction level based on of a plurality of the acquired and accumulated pieces of satisfaction level information (Step S7). Also by this charging method, as described above, it is possible to achieve both suppression of battery deterioration and securing of battery capacity for each user U.

Note that the effects described in the present disclosure are merely examples and are not limited to the disclosed contents. There may be other effects.

Although the embodiments of the present disclosure have been described above, the technical scope of the present disclosure is not limited to the above-described embodiments as it is, and various modifications can be made without departing from the gist of the present disclosure. Furthermore, components of different embodiments and modification examples may be appropriately combined.

Note that the present technique can also have the following configurations.

(1) An electronic device comprising:

a battery;

an acquisition unit that acquires, at each predetermined timing, satisfaction level information in which a residual capacity of the battery and a user satisfaction level with the residual capacity are associated with each other; and a charging unit that charges the battery with a charging voltage calculated as a voltage for charging the battery until the battery has a residual capacity that makes it difficult for a subsequent user satisfaction level to fall below a specific satisfaction level based on of a plurality of the pieces of satisfaction level information acquired and accumulated by the acquisition unit.

(2) The electronic device according to (1), wherein the user satisfaction level is selected from a plurality of satisfaction levels indicating dissatisfaction to satisfaction in stages, and the specific satisfaction level is a satisfaction level indicating dissatisfaction among the plurality of satisfaction levels.

(3) The electronic device according to (2), wherein the plurality of satisfaction levels includes a plurality of satisfaction levels indicating dissatisfaction in stages, and the specific satisfaction level is a satisfaction level most satisfactory among a plurality of satisfaction levels indicating the dissatisfaction in stages.

(4) The electronic device according to (2), wherein the specific satisfaction level is a satisfaction level between a most satisfactory satisfaction level among a plurality of satisfaction levels indicating the dissatisfaction in stages and a satisfaction level indicating satisfaction.

(5) The electronic device according to any one of (1) to (4), wherein the charging voltage is calculated as a voltage for charging the battery until the battery has a residual capacity at which a user satisfaction level when it is assumed that an amount of power used in a past arbitrary use period of the battery is used becomes the specific satisfaction level.

(6) The electronic device according to any one of (1) to (5), wherein the charging voltage is calculated based on an average value or a median value for each user satisfaction level of a plurality of used capacities corresponding to a plurality of the residual capacities acquired and accumulated by the acquisition unit.

(7) The electronic device according to any one of (1) to (6), wherein the charging voltage is calculated based on an approximate line indicating a relationship between a plurality of used capacities corresponding to a plurality of the residual capacities acquired and accumulated by the acquisition unit and the user satisfaction level.

(8) The electronic device according to any one of (1) to (7), wherein the acquisition unit acquires release instruction information instructing release of charging of the battery at the calculated charging voltage, and when the acquisition unit acquires the release instruction information, the charging unit charges the battery with a charging voltage for maximizing the residual capacity of the battery.

(9) A charging system comprising:

a plurality of electronic devices; and a proposal device configured to be able to communicate with each of the plurality of electronic devices, wherein each of the plurality of electronic devices includes:

a battery;

an acquisition unit that acquires, at each predetermined timing, satisfaction level information in which a residual capacity of the battery and a user satisfaction level with the residual capacity are associated with each other; and a charging unit that charges the battery, the plurality of electronic devices include a first electronic device in which the charging unit charges the battery with a charging voltage calculated as a voltage for charging the battery until the battery has a residual capacity that makes it difficult for a subsequent user satisfaction level to fall below a specific satisfaction level based on of a plurality of the pieces of satisfaction level information acquired and accumulated by the acquisition unit, and the proposal device proposes charging with a charging voltage calculated as a voltage for charging the battery of the first electronic device to a user of a second electronic device different from the first electronic device.

(10) The charging system according to (9), wherein the proposal device proposes, to a user of the second electronic device specified based on a comparison result between a plurality of pieces of satisfaction level information acquired and accumulated by the acquisition unit of the first electronic device and a plurality of pieces of satisfaction level information acquired and accumulated by the acquisition unit of each of the other electronic devices, charging with a charging voltage calculated as a voltage for charging the battery of the first electronic device.

(11) A charging method comprising:

acquiring, at each predetermined timing, satisfaction level information in which a residual capacity of a battery of an electronic device and a user satisfaction level with the residual capacity are associated with each other; and charging the battery with a charging voltage calculated as a voltage for charging the battery until the battery has a residual capacity that makes it difficult for a subsequent user satisfaction level to fall below a specific satisfaction level based on of a plurality of the acquired and accumulated pieces of satisfaction level information.

REFERENCE SIGNS LIST

1 ELECTRONIC DEVICE
**1*a*** DISPLAY SCREEN
2 PROPOSAL DEVICE
3 CHARGING SYSTEM
11 BATTERY
12 ACQUISITION UNIT
13 STORAGE UNIT
**13*a*** DATA LIST
14 CALCULATION UNIT

15 CHARGING UNIT
21 STORAGE UNIT
21*a* DATA LIST
22 COMPARISON UNIT
23 PROPOSAL UNIT
U USER

The invention claimed is:

1. An electronic device comprising:

a battery;

an acquisition unit that acquires, at each predetermined timing, satisfaction level information in which a residual capacity of the battery and a user satisfaction level with the residual capacity are associated with each other; and a charging unit that charges the battery with a charging voltage calculated as a voltage for charging the battery until the battery has a residual capacity that makes it difficult for a subsequent user satisfaction level to fall below a specific satisfaction level based on of a plurality of the pieces of satisfaction level information acquired and accumulated by the acquisition unit.

2. The electronic device according to claim 1, wherein the user satisfaction level is selected from a plurality of satisfaction levels indicating dissatisfaction to satisfaction in stages, and the specific satisfaction level is a satisfaction level indicating dissatisfaction among the plurality of satisfaction levels.

3. The electronic device according to claim 2, wherein the plurality of satisfaction levels includes a plurality of satisfaction levels indicating dissatisfaction in stages, and the specific satisfaction level is a satisfaction level most satisfactory among a plurality of satisfaction levels indicating the dissatisfaction in stages.

4. The electronic device according to claim 2, wherein the specific satisfaction level is a satisfaction level between a most satisfactory satisfaction level among a plurality of satisfaction levels indicating the dissatisfaction in stages and a satisfaction level indicating satisfaction.

5. The electronic device according to claim 1, wherein the charging voltage is calculated as a voltage for charging the battery until the battery has a residual capacity at which a user satisfaction level when it is assumed that an amount of power used in a past arbitrary use period of the battery is used becomes the specific satisfaction level.

6. The electronic device according to claim 1, wherein the charging voltage is calculated based on an average value or a median value for each user satisfaction level of a plurality of used capacities corresponding to a plurality of the residual capacities acquired and accumulated by the acquisition unit.

7. The electronic device according to claim 1, wherein the charging voltage is calculated based on an approximate line indicating a relationship between a plurality of used capacities corresponding to a plurality of the residual capacities acquired and accumulated by the acquisition unit and the user satisfaction level.

8. The electronic device according to claim 1, wherein the acquisition unit acquires release instruction information instructing release of charging of the battery at the calculated charging voltage, and when the acquisition unit acquires the release instruction information, the charging unit charges the battery with a charging voltage for maximizing the residual capacity of the battery.

9. A charging system comprising:

a plurality of electronic devices; and a proposal device configured to be able to communicate with each of the plurality of electronic devices, wherein each of the plurality of electronic devices includes:

a battery;

an acquisition unit that acquires, at each predetermined timing, satisfaction level information in which a residual capacity of the battery and a user satisfaction level with the residual capacity are associated with each other; and a charging unit that charges the battery, the plurality of electronic devices include a first electronic device in which the charging unit charges the battery with a charging voltage calculated as a voltage for charging the battery until the battery has a residual capacity that makes it difficult for a subsequent user satisfaction level to fall below a specific satisfaction level based on of a plurality of the pieces of satisfaction level information acquired and accumulated by the acquisition unit, and the proposal device proposes charging with a charging voltage calculated as a voltage for charging the battery of the first electronic device to a user of a second electronic device different from the first electronic device.

10. The charging system according to claim 9, wherein the proposal device proposes, to a user of the second electronic device specified based on a comparison result between a plurality of pieces of satisfaction level information acquired and accumulated by the acquisition unit of the first electronic device and a plurality of pieces of satisfaction level information acquired and accumulated by the acquisition unit of each of the other electronic devices, charging with a charging voltage calculated as a voltage for charging the battery of the first electronic device.

11. A charging method comprising:

acquiring, at each predetermined timing, satisfaction level information in which a residual capacity of a battery of an electronic device and a user satisfaction level with the residual capacity are associated with each other; and charging the battery with a charging voltage calculated as a voltage for charging the battery until the battery has a residual capacity that makes it difficult for a subsequent user satisfaction level to fall below a specific satisfaction level based on of a plurality of the acquired and accumulated pieces of satisfaction level information.

* * * * *